US011417068B1

(12) United States Patent
Burris et al.

(10) Patent No.: US 11,417,068 B1
(45) Date of Patent: Aug. 16, 2022

(54) SYSTEM AND METHOD FOR AUGMENTED REALITY INTERACTION AT A SELF-SERVICE TERMINAL

(71) Applicant: NCR Corporation, Duluth, GA (US)

(72) Inventors: Matthew Robert Burris, Atlanta, GA (US); Christopher John Costello, Suwanee, GA (US); Caleb Martinez, Fayetteville, GA (US); Brian Robert Compau, Hoschton, GA (US)

(73) Assignee: NCR Corporation, Atlanta, GA (US)

( * ) Notice: Subject to any disclaimer, the term of this patent is extended or adjusted under 35 U.S.C. 154(b) by 0 days.

(21) Appl. No.: 17/341,958

(22) Filed: Jun. 8, 2021

(51) Int. Cl.
| | |
|---|---|
| *G06T 19/00* | (2011.01) |
| *G06T 7/50* | (2017.01) |
| *G06F 3/04842* | (2022.01) |
| *G06Q 20/40* | (2012.01) |
| *G06Q 20/10* | (2012.01) |
| *G06F 3/042* | (2006.01) |

(52) U.S. Cl.
CPC .......... *G06T 19/006* (2013.01); *G06F 3/0425* (2013.01); *G06F 3/04842* (2013.01); *G06Q 20/1085* (2013.01); *G06Q 20/4012* (2013.01); *G06T 7/50* (2017.01); *G06T 2200/24* (2013.01); *G06T 2207/10028* (2013.01)

(58) Field of Classification Search
None
See application file for complete search history.

(56) References Cited

U.S. PATENT DOCUMENTS

| | | | |
|---|---|---|---|
| 9,477,317 B1* | 10/2016 | Clements | G06F 3/017 |
| 10,331,874 B1* | 6/2019 | Benkreira | G06F 21/35 |
| 2013/0182904 A1* | 7/2013 | Zhang | G06T 7/73 |
| | | | 382/103 |
| 2018/0089935 A1* | 3/2018 | Froy, Jr. | G07F 17/3225 |

* cited by examiner

*Primary Examiner* — Yanna Wu
(74) *Attorney, Agent, or Firm* — Mandelbaum Silfin Economou LLP; John S. Economou

(57) ABSTRACT

A system and method for providing an augmented reality (AR) interaction zone to a user of a mobile device to provide remote access to a self-service terminal (SST) having a controller, a display for providing information and instructions to a user, a keypad for entering user data and user commands, and a camera (preferably a depth camera). A mobile device selectively initiates, based on a user command, a transaction by establishing a wireless communications channel with the SST. The controller generates the AR interaction zone based on signals from the camera, provides a signal to the mobile device to display an AR input field on an integral display, processes signals from the camera to monitor the AR interaction zone for user movement corresponding to input, identifies input based on the signals from the camera, and causes the SST to process a requested user transaction based on the identified input.

14 Claims, 3 Drawing Sheets

SYSTEM AND METHOD FOR AUGMENTED REALITY INTERACTION AT A SELF-SERVICE TERMINAL

FIELD

This disclosure relates generally to a system and method for providing an augmented reality interaction zone for a mobile device user at a self-service terminal.

BACKGROUND

Self-service terminals, such as automatic teller machines (ATMs), typically require a user to stand in front of the terminal in order to interact with the terminal by reading instructions on the terminal's integral display and entering information on the display (if a touchscreen type display) and/or on an integral keypad. This can lead to problems in using the self-service terminal for those unable to stand, e.g., disabled users such as those confined to a wheelchair.

Governments have started to mandate that services provided to non-disabled customers of a business must be provided to disabled customers in a manner that accommodates the disabled customers. At the present time there are a significant number of self-service terminals installed in the U.S. Conversion of all of the installed base of self-service terminals to accommodate disabled customers will be quite costly because significant structural changes will likely be required at existing terminals in order to position the terminal lower for access by a disabled customer in a wheelchair.

Accordingly, because of the expense of replacing and renovating installed self-service terminals, there is a need for an alternative and less-expensive way to provide a terminal accessible for use by the disabled.

BRIEF DESCRIPTION OF THE DRAWINGS

The following detailed description, given by way of example and not intended to limit the present disclosure solely thereto, will best be understood in conjunction with the accompanying drawings in which.

DETAILED DESCRIPTION

In the present disclosure, like reference numbers refer to like elements throughout the drawings, which illustrate various exemplary embodiments of the present disclosure. Augmented reality is the modification of a real-life environment by the addition of computer generated perceptual information. The system and method of the present disclosure provide an augmented reality display via a user's mobile device of a self-service terminal's display and keypad. The augmented reality display is generated using the input of a camera (preferably a depth camera) coupled to the self-service terminal and the display include an overlay of the user's hand onto the mobile device display. As known in the art, a depth camera provides both information in three-dimensions, including a conventional two-dimensional image and additional information about the distance to objects within the two-dimensional information. The augmented reality display allows the user to virtually manipulate the keypad and/or touchscreen of the self-service terminal without having to stand in front of the terminal.

Figure 1:
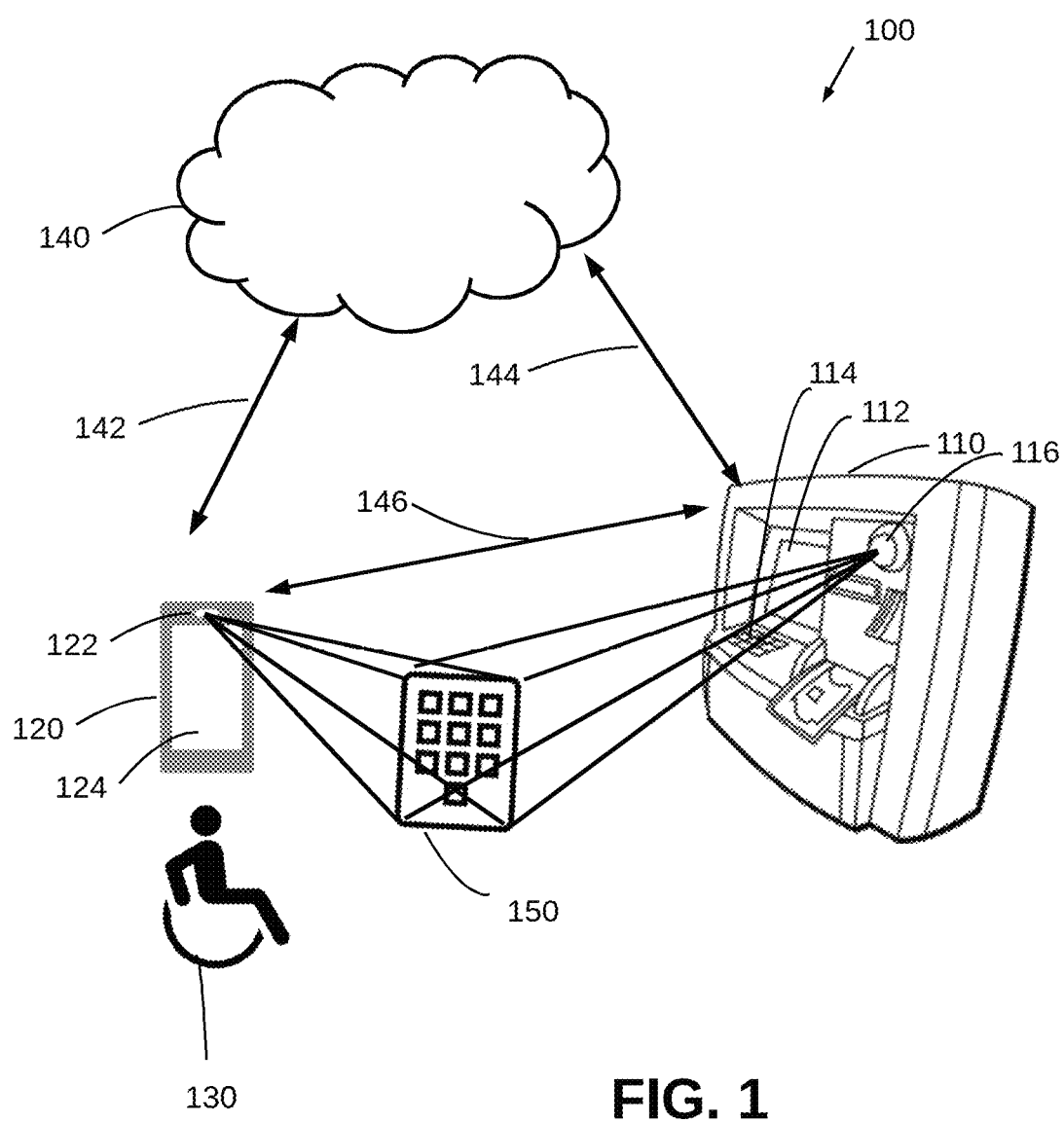
FIG. 1 is a diagram of a system for providing access to a self-service terminal using augmented reality interaction.

Referring to FIG. 1, a system 100 for providing an augmented reality interaction zone 150 includes a terminal 110, i.e., a self-service terminal such as an ATM, interactive kiosk, self-checkout machine, etc., that has a display 112 and a keypad 114. The display 112 provides information and instructions for use of the terminal 110 and the keypad 114 is used to enter information (i.e., user data and user instructions), including the user's PIN code. In some cases the display 112 may be a touchscreen incorporating at least some of the functions of the keypad. The terminal 110 also includes a camera 116 that is used to establish the augmented reality interaction zone, as discussed below. Camera 116 is preferably a depth camera (e.g., a RealSense Depth Camera available from Intel) but acceptable results can be obtained using an ordinary two-dimensional type camera. A user 130 (shown as a disabled person in a wheelchair but the present invention is adaptable for use by anyone) uses a mobile device 120 to establish a wireless connection (communication channel) with the terminal 110. The mobile device 120 is configured via a dedicated program (app) or via a function of a mobile app provided by the self-service terminal company (e.g., a mobile app provided by a bank when the self-service terminal is an ATM). The wireless connection may established remotely via a wide area network (e.g., internet) connection (web socket) (shown in FIG. 1 by lines 142, 144 and cloud 140) or locally (line 146) via a direct radio communication channel, such as a local Wi-Fi channel (IEEE 802.11), a Bluetooth wireless channel, or a near field communication channel. Once the connection is established, the terminal 110 uses the output signals from the camera 116 and the output signal from a camera 122 integrated to the user's mobile device 120 received via the wireless connection to set up the augmented reality interaction zone 150. In some cases the signals from camera 116 may be used alone. The terminal 110 sends information to mobile device 120 to provide a view on a display 124 integrated to the mobile device 120 which allows the user 130 to see the terminal's display 112 and keypad 114 virtually via the display 124 of the mobile device 120 and to interact therewith by using hand gestures (or other similar types of movement) in the augmented reality interaction zone 150. In particular, a common reference point is established by terminal 110 based, preferably, on the signals from each camera, i.e., camera 116 and camera 122, to create a shared interaction space and establish a connection between the devices for the current interaction session. In some cases the signals from camera 116 may be used alone. Terminal 110, via camera 116 and/or camera 122, then detects the movement of the user 130 within that interaction space and translates that movement into particular keypad entries. This allows the user 130 to access and use the terminal 110 without standing directly in front of the terminal 110. By modifying existing terminals (or replacing existing terminals with upgraded terminals in the same existing terminal framework), significant cost-savings can be achieved while providing full access to any user unable to stand in front of terminal.

Figure 2:
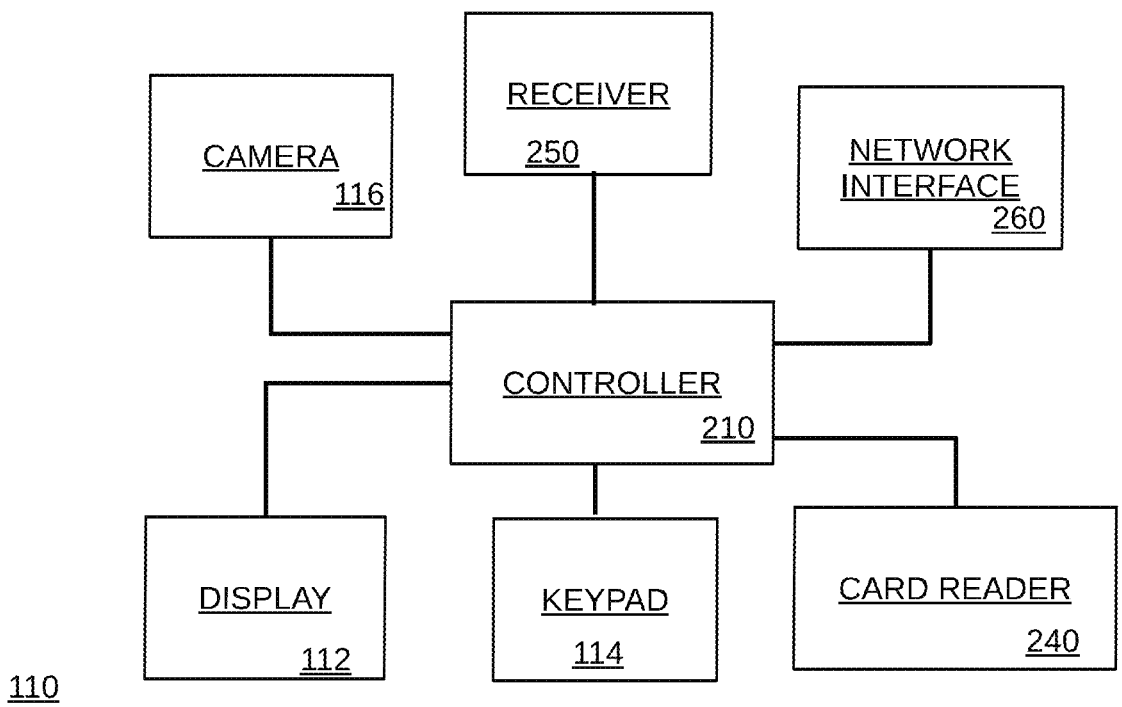
FIG. 2 is a block diagram of the self-service terminal of the system of FIG. 1.

Referring to FIG. 2, a block diagram of the terminal 110 is shown. Terminal 110 includes a controller 210 that is coupled to the display 112, keypad 114, and the camera 116 introduced in FIG. 1. Controller 210 is also coupled to a card reader 240 (for normal operation) and a network interface 260 for access to internet communications via a local area network. Finally, terminal 110 may include a receiver 250 coupled to the controller 210 for use when the user's mobile device 120 is coupled directly to the terminal 110 via a local radio communication channel (i.e., line 146 in FIG. 1) instead of via the internet. The type of receiver 250 implemented depends on type of local radio communication channel selected (e.g., a local Wi-Fi channel (IEEE 802.11), a Bluetooth wireless channel, or a near field communication channel). As understood by those of skill in the art, terminal 110 may include various other structures depending on the particular function of the terminal. For example, when terminal 110 is an ATM, structures for receiving and dispensing bank notes will be present.

Figure 3:
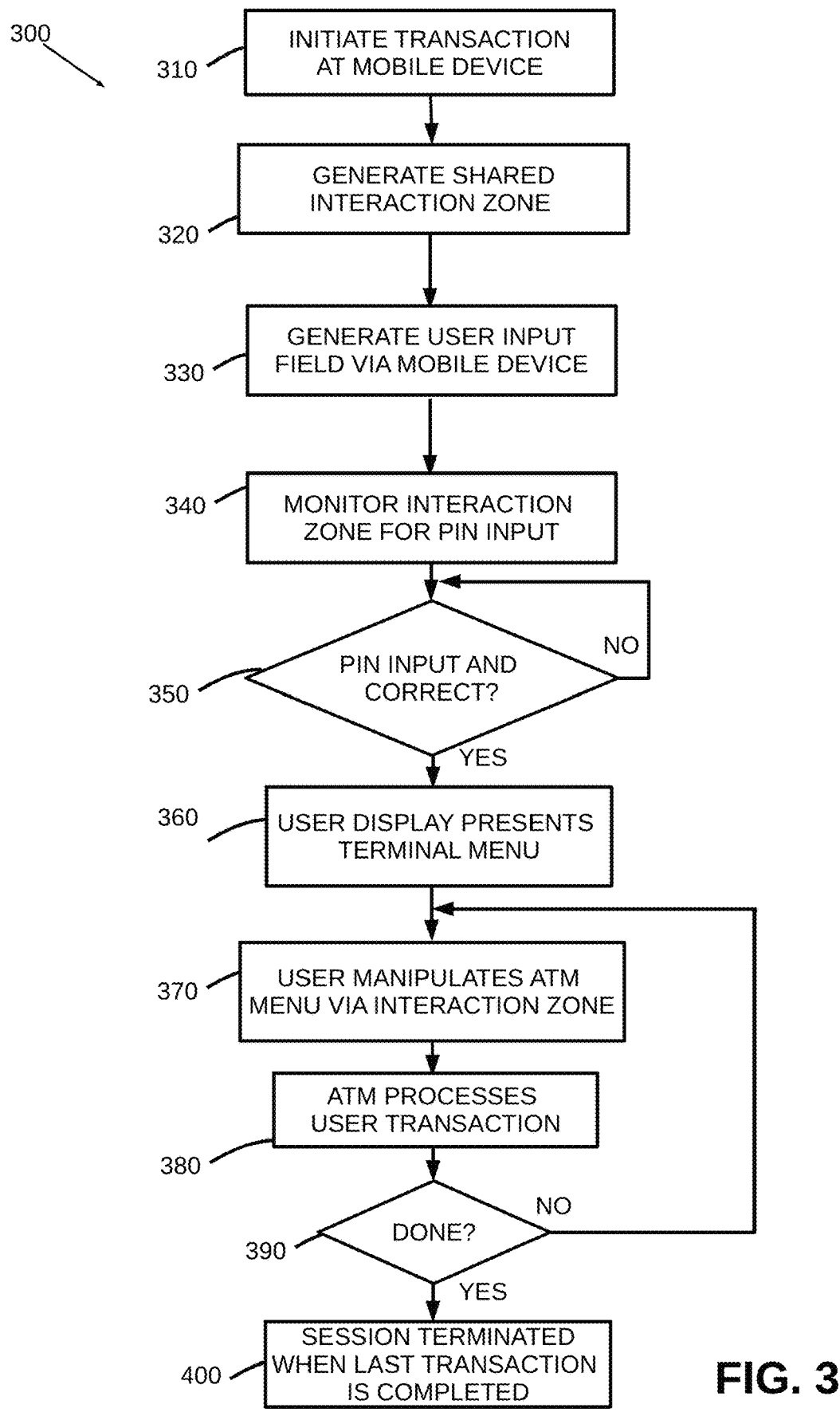
FIG. 3 is a flowchart of a method for providing access to a self-service terminal using augmented reality interaction using the system of FIG. 1.

Referring to FIG. 3, a flowchart 300 is shown that details the method of operation of the system 100 shown in FIG. 1. First, at step 310, a user initiates a transaction at terminal 110. This is done by enabling an associated application program (app) previously installed on the mobile device 120 and then linking to the terminal 110 adjacent to the user. The app can link to the terminal 110 adjacent to the user's location by one of a number of ways. For example, the app can request that the user scan a QR code on the terminal 110 or the app can generate a QR code that is scanned by the camera 116 on terminal 110. Alternatively, the app can generate a NFC signal received by an NFC receiver on terminal 110. In another alternative, the app can communicate via the internet or the local radio communication channel (if present) to link to terminal 110. The app may also verify the user's identity prior to use using facial recognition, fingerprint recognition, or entry of a local PIN code as known in the art.

Next, at step 320, a shared augmented reality interaction zone 150 is established by terminal 110. Establishing the shared augmented reality interaction zone 150 requires that the mobile device 120 and the terminal 110 identify the relative field of view of each other. This is accomplished by identifying specific features inherent to the mobile device 120 and the terminal 110, the user, the local environment, and/or fixing reference points on a device that can be used to create a link between the fields of view. For example, a terminal 110 implementing this system may first identify, from the signals from the two cameras (i.e., camera 116 on terminal 110 and camera 122 on mobile device 120), the arms of a user, then use that arm information to identify the user's hands, and then use that hand information to identify the mobile device 120 to then identify a particular two-dimensional plane from which the user's field of view (FOV) would emanate and the angle of that plane from a reference point on terminal 110. In some cases the signals from camera 116 may be used alone to perform this step. The terminal 110 then determines an approximate size information to build an approximate understanding of the field of view of mobile device 20. Although the signal output from camera 116 in terminal 110 could be used alone to generate the shared augmented reality interaction zone 150, establishing the link between the mobile device 130 and the terminal 110 can enhance the establishment of the shared augmented reality interaction zone 150 by analyzing a number of frames from the output of the camera 122 of the mobile device 120 in order to identify additional key reference points on the terminal 110 or its immediate local location. Once the relative FOVs for the mobile device 120 and the terminal 110 are established, a shared FOV overlap and potential interaction zone (i.e., the shared augmented reality interaction zone 150) is determined based on the relative FOVs.

At step 330, the mobile device 120 generates a user input field (augmented reality user input field) on the display 124 for augmented reality (AR) interaction by the user, e.g., a view of the display 112 and keypad 114. The view provided on display 124 allows a user's intended interactions (movements) in the established shared augmented reality interaction zone 150 to be properly guided and then detected and registered by the camera 116 on the terminal 110. This enables a data entry method that may remove certain government mandated design limitations by putting the interface in the hands of the user while also keeping the interaction secure by only registering the input on the terminal 110 (i.e., no secure information such as the user PIN is recorded by the mobile device 120).

Next, at step 340, terminal 110 monitors the shared augmented reality interaction zone 150 for entry of a PIN on the virtual keypad. By entering the PIN in this manner so that it is only detected by the camera 116 on terminal 110, it will never be available on the mobile device 120 itself. Feedback may be provided to the user about each user input via an audio beep (either via terminal 110 or mobile device 120) or by an on-screen notification on the display 124 of mobile device 120. Terminal 110 verifies that PIN has been entered correctly at step 350, and processing proceeds to step 360, where the mobile device 120 provides a view on display 124 of the complete terminal (e.g., ATM) menu to the user 130 once the user is authorized. Some terminals may not require user authorization and step 340 and step 350 may be omitted for such terminals.

The user then manipulates the menu at step 370, using movements tracked on the augmented reality display on the display 124 the mobile device 120, in order to complete the desired transaction. Here again, feedback may be provided to the user about each user input via an audio beep (either via terminal 110 or mobile device 120) or by an on-screen notification on the display 124 of mobile device 120. The terminal processes the transaction at step 380, and determines if additional transactions are needed at step 390. If additional transactions are required, processing reverts to step 370, otherwise the current session is terminated at step 400 when the final transaction is complete.

The system and method of the present disclosure provides for the creation of a shared interaction zone between a fixed device (e.g., a self-service terminal) and a mobile device and for capturing the interaction of a user on the fixed device as the user interacts with an AR projection as seen through their mobile device. This solution can provide compliance with government regulations for access without the need for complete retrofits of the terminal. This solution also maintains the high security of fixed device interaction by ensuring that all data input (including the PIN) is only on the fixed device and ensures that the mobile device is never able to obtain and pass data and other commands to the fixed device for control thereof.

Although the present disclosure has been particularly shown and described with reference to the preferred embodiments and various aspects thereof, it will be appreciated by those of ordinary skill in the art that various changes and modifications may be made without departing from the spirit and scope of the disclosure. It is intended that the appended claims be interpreted as including the embodiments described herein, the alternatives mentioned above, and all equivalents thereto.

What is claimed is:

1. A system for providing an augmented reality interaction zone to a user of a mobile device to provide remote access to a self-service terminal, comprising:

a mobile device having an integral camera and an integral display; and a self-service terminal having a controller, a display for providing information and instructions to a user, a keypad for entering user data and user commands, and a camera;
wherein:
the mobile device selectively initiates, based on a user command, a transaction with the self-service terminal by establishing a wireless communications channel therewith;
the controller generates an augmented reality interaction zone based on signals from the camera at the self-service terminal by identifying a particular two-dimensional plane corresponding to a field of view of the user and an angle of the particular two-dimensional plane from a reference point on the self-service terminal;
the controller provides a signal to the mobile device to display an augmented reality input field on the integral display;
the controller processes signals from the camera at the self-service terminal to monitor the augmented reality interaction zone for user movement corresponding to user input; and
the controller identifies user input based on the signals from the camera at the self-service terminal and causes the self-service terminal to process a requested user transaction based on the identified user input.

2. The system of claim 1, wherein the controller generates the augmented reality interaction zone based on signals from the camera at the self-service terminal and from the integral camera of the mobile device.

3. The system of claim 2, wherein the camera at the self-service terminal is a depth camera.

4. The system of claim 1, wherein the camera at the self-service terminal is a depth camera.

5. The system of claim 1, wherein the controller only causes the self-service terminal to process a requested user transaction based on the identified user input after receiving and verifying identified user input corresponding to a PIN code of that user.

6. A self-service terminal for providing an augmented reality interaction zone to a user of a mobile device for remote access of the self-service terminal, comprising:
a controller, a display for providing information and instructions to a user, a keypad for entering user data and user commands, and a camera;
wherein:
a user of a mobile device enters a command to cause the mobile device to selectively initiate a transaction with the self-service terminal by establishing a wireless communications channel therewith;
the controller generates an augmented reality interaction zone based on signals from the camera at the self-service terminal by identifying a particular two-dimensional plane corresponding to a field of view of the user and an angle of the particular two-dimensional plane from a reference point on the self-service terminal;
the controller provides a signal to the mobile device to display an augmented reality input field on an integral display of the mobile device;
the controller processes signals from the camera at the self-service terminal to monitor the augmented reality interaction zone for user movement corresponding to user input; and
the controller identifies user input based on the signals from the camera at the self-service terminal and causes the self-service terminal to process a requested user transaction based on the identified user input.

7. The self-service terminal of claim 6, wherein the controller generates the augmented reality interaction zone based on signals from the camera at the self-service terminal and from an integral camera of the mobile device.

8. The self-service terminal of claim 7, wherein the camera at the self-service terminal is a depth camera.

9. The self-service terminal of claim 6, wherein the camera at the self-service terminal is a depth camera.

10. The self-service terminal of claim 6, wherein the controller only causes the self-service terminal to process a requested user transaction based on the identified user input after receiving and verifying identified user input corresponding to a PIN code of that user.

11. A method for providing an augmented reality interaction zone to a user of a mobile device to provide remote access to a self-service terminal, comprising:
selectively initiating, based on a user command to a mobile device, a transaction with the self-service terminal by establishing a wireless communications channel therewith;
generating an augmented reality interaction zone based on signals from a camera at the self-service terminal by identifying a particular two-dimensional plane corresponding to a field of view of the user and an angle of the particular two-dimensional plane from a reference point on the self-service terminal;
providing a signal from the self-service terminal to the mobile device to display an augmented reality input field on an integral display of the mobile device;
processing signals from the camera at the self-service terminal to monitor the augmented reality interaction zone for user movement corresponding to user input; and
identifying user input based on the signals from the camera at the self-service terminal and processing, at the self-service terminal, a requested user transaction based on the identified user input.

12. The method of claim 11, wherein the augmented reality interaction zone is generated based on signals from the camera at the self-service terminal and from an integral camera of the mobile device.

13. The method of claim 12, wherein the camera at the self-service terminal is a depth camera.

14. The method of claim 11, wherein the camera at the self-service terminal is a depth camera.

* * * * *